United States Patent [19]

Takeya et al.

[11] Patent Number: 5,065,386
[45] Date of Patent: Nov. 12, 1991

[54] SERVO SYSTEM RESPONSIVE TO NOISE AND HAVING VARIABLE CHARACTERISTIC FILTER MEANS

[75] Inventors: Noriyoshi Takeya; Hidehiro Ishii; Chiharu Miura; Tatsuya Fukuda, all of Tokorozawa, Japan

[73] Assignee: Pioneer Electronic Corporation, Tokyo, Japan

[21] Appl. No.: 452,703

[22] Filed: Dec. 14, 1989

[30] Foreign Application Priority Data

Apr. 5, 1989 [JP] Japan .................................. 1-86033

[51] Int. Cl.[5] .............................................. G11B 7/00
[52] U.S. Cl. ................................................. 369/44.32
[58] Field of Search ................... 250/201.5; 369/44.32, 369/44.33, 44.34, 44.35, 44.36, 54, 58; 360/77.02

[56] References Cited

U.S. PATENT DOCUMENTS 4,688,202 8/1987 Mukai et al. .................. 369/44.34 X Primary Examiner—Robert L. Richardson
Attorney, Agent, or Firm—Perman & Green

[57] ABSTRACT

A servo system for a disc player having a pickup for reading information recorded on an information recording disc, includes an A/D converter for converting an error signal produced on the basis of signals output from the pickup into a digital signal, and performs driving and control of the pick up according to the signal level of the error signal having been processed digitally. The servo system further comprises a filter circuit permitting low frequency components of the error signal to pass therethrough and supplying the low frequency components to the A/D converter, detection circuit detecting noise components having levels higher than a predetermined level, contained in the error signal, and a circuit generating a control signal for a predetermined period after an instant of detection of the noise components by the detection circuit. The filter circuit has a first transmission characteristic with a cut-off frequency below one half of a sampling frequency of the A/D converter when the control signal is absent, and a second transmission characteristic with another cut-off frequency lower than the cut-off frequency when the control signal is present.

2 Claims, 10 Drawing Sheets

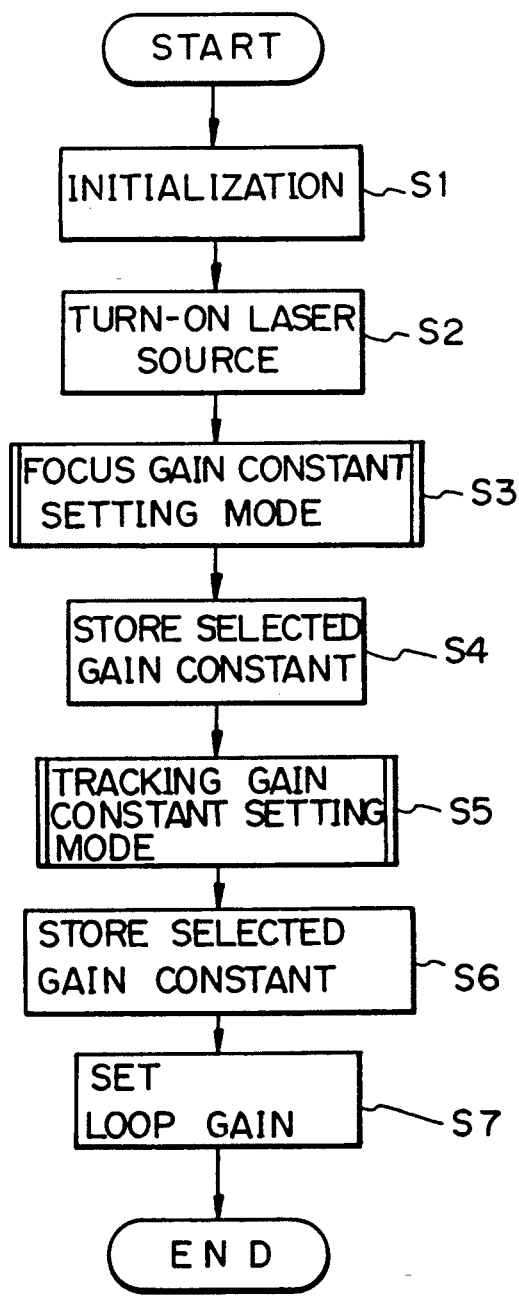

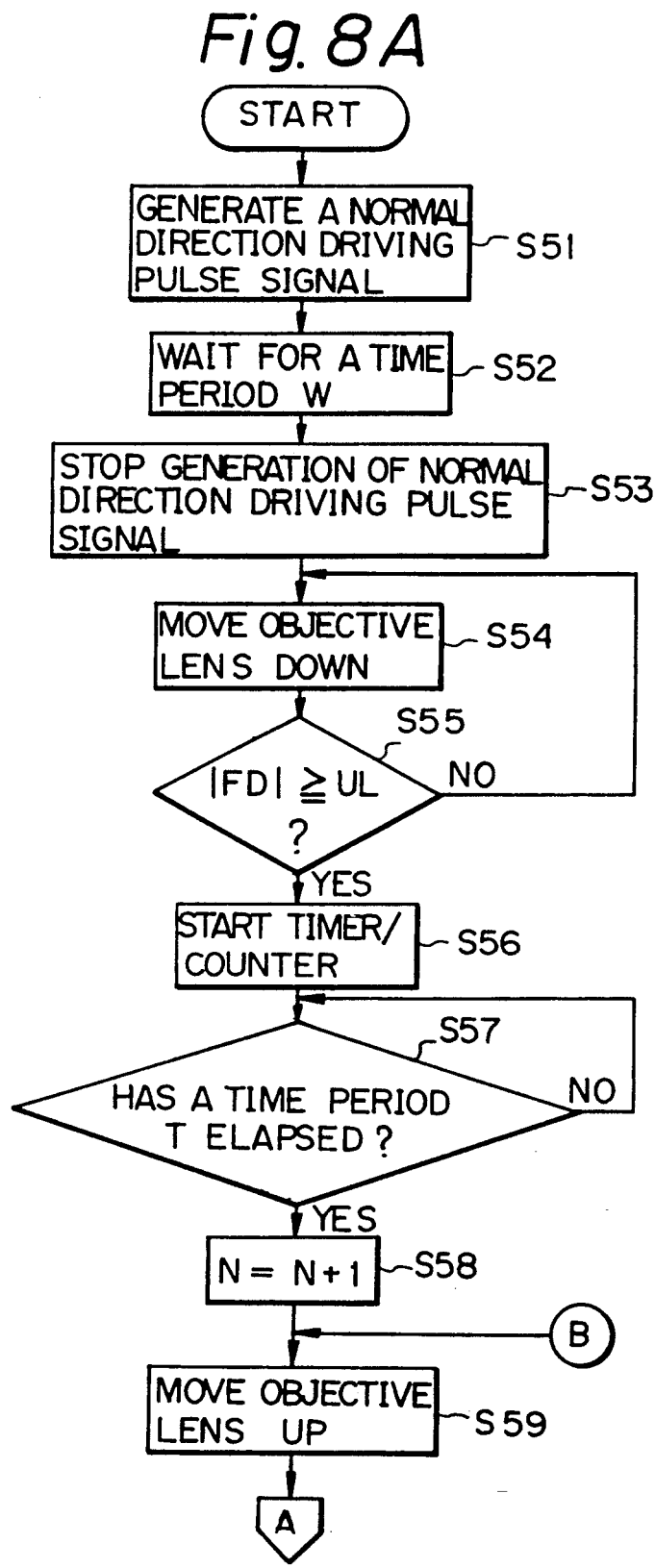

ORIGINAL SIGNAL

SAMPLING

ORIGINAL SIGNAL  $\frac{1}{2}fs$  fs  2fs

ORIGINAL SIGNAL

SAMPLING

DISTURBED PORTION OF FUNDAMENTAL WAVE $\frac{1}{2}fs$  fs  2fs

SERVO SYSTEM RESPONSIVE TO NOISE AND HAVING VARIABLE CHARACTERISTIC FILTER MEANS

BACKGROUND OF THE INVENTION

1. Field of the Invention

The present invention relates to a servo system for a disc player, and more particularly to a servo system in which error signals are A/D converted for digital processing.

2. Description of Background Information

In optical disc players for playing an information recording disc (simply referred to as disc hereinafter) such as a video disc or a digital audio disc, it is necessary to use a focus servo system for converging the light beam onto the surface of the disc to form a light spot for reading information and a tracking servo system for moving the information reading point so that it follows the recording track accurately.

As the focus servo system, systems according to a so-called astigmatic method are known, which systems are arranged such that the light beam is converged, by using a cylindrical lens for example, as a focal line in horizontal direction at one of two points on the light path of the light beam which are apart from each other, and also converged as a focal line in vertical direction at the other of the two points, a light sensor of a quadrant type is disposed at a middle position of the two points to generate an error signal, and a focus error signal is generated from four output signals of the quadrant type light sensor.

As the tracking servo system, systems according to a so-called three-beam method is known, which systems are arranged such that three beams including a main beam for reading information and two sub-beams for detecting tracking errors disposed on both sides of the main beam are prepared and arranged so that a line passing centers of the three beams forms a predetermined off-set angle with respect to the direction of the track, and an error signal is generated from a difference between the amount of the two sub-beams reflected by the recording surface of the disc.

For such servo systems, recently digital servo systems have become used frequently, in which each error signal is A/D (analog to digital) converted and processed in digital form. In these servo systems having digital circuit construction, a bandwidth limiting process is effected to an input error signal by means of an analog low-pass filter so that the bandwidth of the input (or original) error signal is limited within one half of the sampling frequency of the A/D converter, as illustrated in FIG. 11A. By this provision, an aliasing during the sampling is prevented, as illustrated in FIG. 11B On the other hand, if there is a scratch or flaw on the surface of the information bearing layer of the disc, high frequency noise components above one half of the sampling frequency, e.g. above 20 KHz, can be superimposed on the error signal depending on the kind of the scratch. However, because of the cost, it is difficult to completely suppress such high frequency noise components by means of an analog low-pass filter. Therefore, even if the original error signal including noises of the frequency components above one half of the sampling frequency of the A/D converter is supplied to the low-pass filter, the noise components are not completely suppressed, as typically illustrated in FIG. 12A. If these noise components are supplied to the A/D converter without being further processed, adverse effects of the aliasing distortion will be generated in the passing band. For example, inconveniences such as the drop out of the signal reproduced from the disc or the track-jumping of the information reading point will arise from the aliasing noise.

OBJECT AND SUMMARY OF THE INVENTION

The object of the present invention is to provide a servo system for a disc player by which the inconveniences such as the drop-out of the reproduced signal and the track jumping are prevented whatever kind of scratch or flaw may exist on the surface of the information bearing layer of the disc.

According to the present invention, a servo system for a disc player having a pickup for reading information recorded on an information recording disc includes an A/D converter for converting an error signal produced on the basis of signals output from the pickup into a digital signal, and adapted to drive and control the pickup according to the signal level of the error signal having been processed digitally. The servo system further comprises filter means for permitting low frequency components of the error signal to pass therethrough and supplying the low frequency components to the A/D converter, detection means for detecting noise components having levels higher than a predetermined level, contained in the error signal, and means for generating a control signal for a predetermined period after an instant of detection of the noise components by the detection means, wherein the filter means is adapted to have a first transmission characteristic with a cut-off frequency below one half of a sampling frequency of the A/D converter when the control signal is absent, and a second transmission characteristic with another cut-off frequency lower than the cut-off frequency when the control signal is present.

Thus, in the case of the servo system for a disc player according to the present invention, the bandwidth of the error signal to be supplied to the A/D converter is limited normally by means of the filter means having the first transmission characteristic with a cut-off frequency below one half of the sampling frequency of the A/D converter. When it is detected that noise components above a predetermined level are contained in the error signal, the noise components are shut-off by the filter means having, in that state, the second transmission characteristic with a cut-off frequency lower than that of the first passing characteristic, for a predetermined time period after the instant of the detection of such noise components.

BRIEF DESCRIPTION OF THE DRAWINGS

FIGS. 4A, 4B, 5A and 5B are waveform diagrams showing first and second noise components in the tracking servo system, in which FIGS. 4A and 5A show the waveforms before noise elimination and FIGS. 4B and 5B show the waveforms after noise elimination;

FIG. 6 is a flowchart showing the procedure of the loop gain setting method according to the present invention;

FIGS. 8A and 8B are a flowchart showing the procedure in the focus-gain constant selecting mode;

DETAILED DESCRIPTION OF PREFERRED EMBODIMENTS

Figure 1:
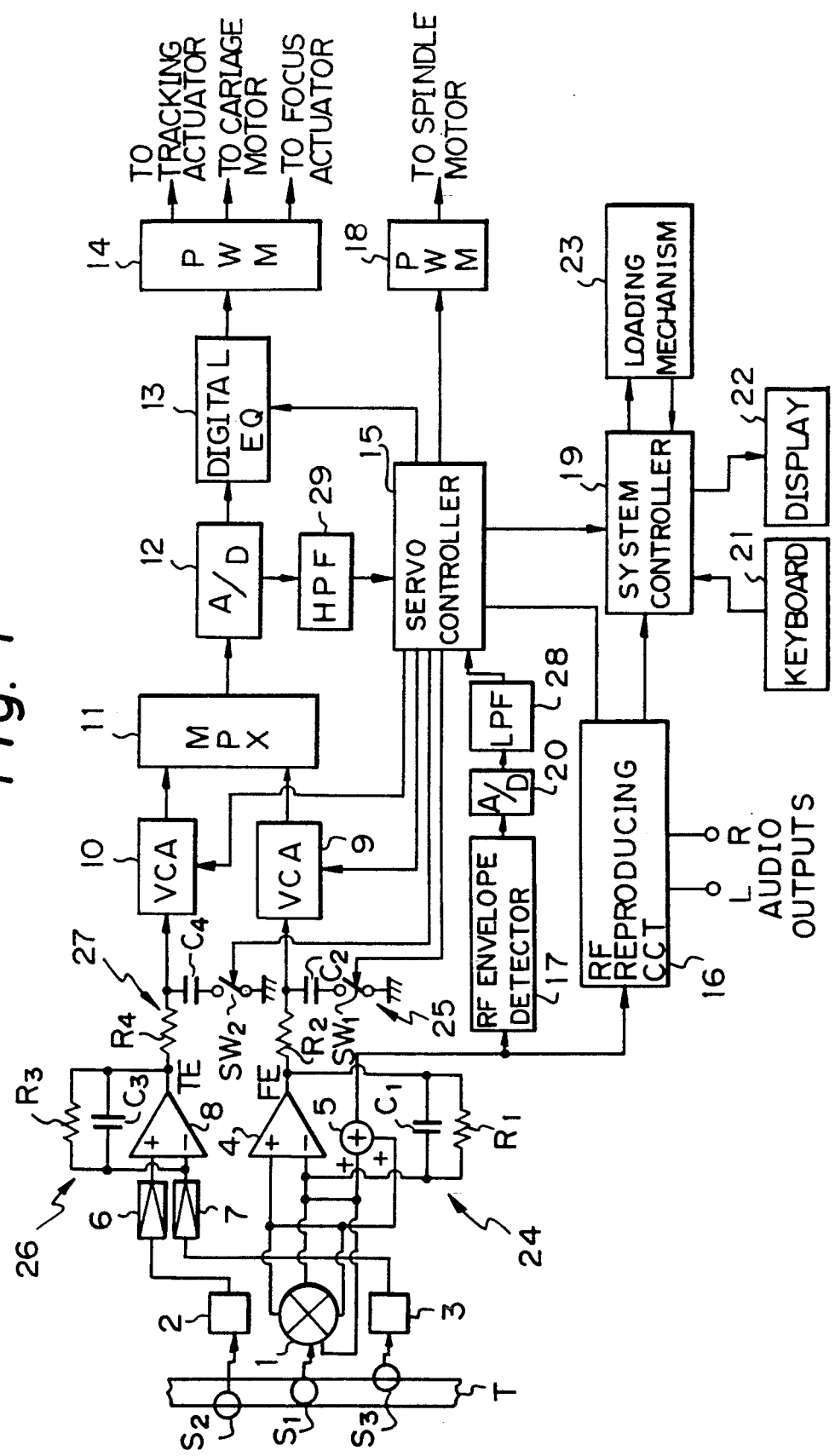
FIG. 1 is a block diagram showing an embodiment of the servo system according to the present invention.

FIG. 1 is a block diagram showing an embodiment of the present invention. In FIG. 1, three beam spots obtained by converging a laser beam, that is, a recorded information reading spot S1, and a pair of spots S2 and S3 for detecting tracking information which precede or follow the spot S1 are irradiated from a pickup (not illustrated) on a recording track T of a disc in such a positional relationship as illustrated. Reflection lights of these beam spots are received by photo-electric transducers 1 through 3 which are incorporated in the pickup, where the received lights are converted to electric signals. The pickup incorporates therein an optical system including an objective lens, a focus actuator for positioning the objective lens in a direction of optical axis with respect to the information recording surface of the disc, and a tracking actuator for positioning the beam spots in a direction of disc radius with respect to the recording track T. This pickup is mounted on a carriage (not shown) which is disposed to be movable along the direction of disc radius.

Figure 2:
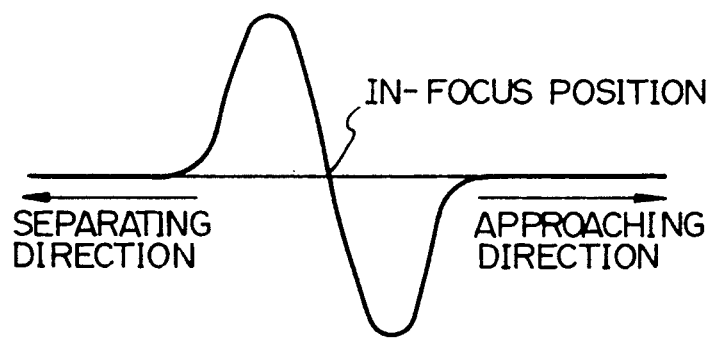
FIG. 2 is a waveform diagram showing the change in the level of a focus error signal with respect to the distance between the objective lens and the disc surface.

The photo-electric transducer 1 is made up of four light receiving elements which are arranged to be bounded by two lines crossing at right angles with each other, and independent from each other. Each sum of output signals of two light receiving elements facing with each other about the center of the light receiving surface is supplied to a differential amplifier 4 in which a difference between two sums is derived The differential signal constitutes a focus error (FE) signal. As shown in FIG. 2, this focus error signal shows the so called S curve characteristic having a zero-crossing point at an on-focus position in a range of the distance between the objective lens and the surface of the disc, as the objective lens moves up and down from the on-focus position. Furthermore, the above-mentioned sums of the output signals of the light receiving elements are supplied to an adder 5 in which a sum total of the output signals of each elements is derived. The sum total will be treated as a read-out RF signal.

Figure 3A:
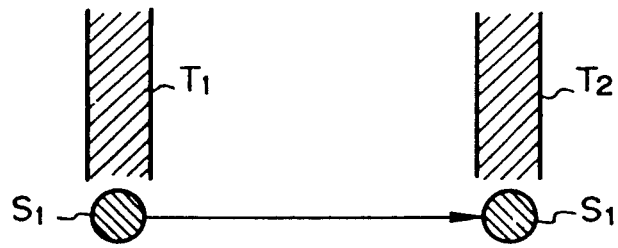
FIGS. 3A and 3B are diagram showing the relationship between the traveled distance of the information reading spot from a recording track and a tracking error signal.
Figure 3B:
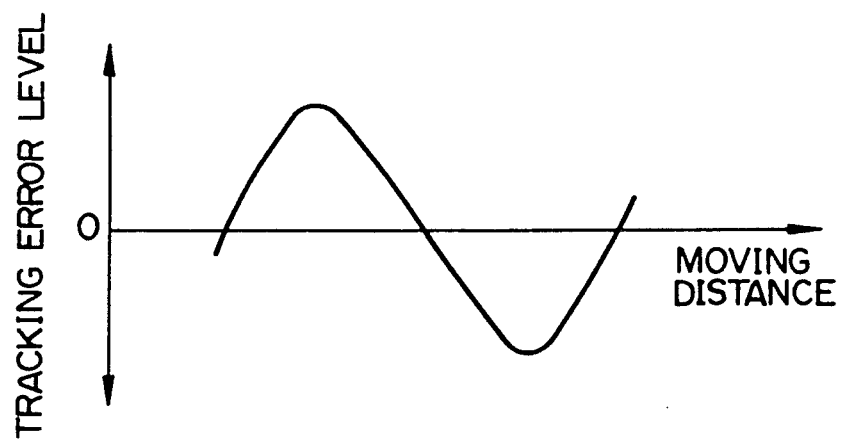

The output signals of the photo-electric transducers 2 and 3 are supplied to a differential amplifier 8 through amplifiers 6 and 7 respectively, in which a differential signal between them is derived. This differential signal will be treated as the tracking error signal (TE). If the beam spot S1 moves from one track T1 to the adjacent track T2 as illustrated in FIG. 3A while the tracking servo loop is open, the tracking error signal varies in the form of a sine wave as shown in FIG. 3B. The level of the tracking error signal is proportional to the amount of the deviation of the beam spot S1 from the recording track T in the vicinity thereof, and the zero-crossing point of the tracking error signal corresponds to the center of the recording track T and also the middle position between two adjacent recording tracks.

The focus error signal is supplied to an LPF (low-pass filter) 24 which consists of a resistor $R_1$ and a capacitor $C_1$, and an LPF 25 which consists of a resistor $R_2$, a capacitor $C_2$, and an electronic switch $SW_1$, whereby unnecessary frequency components are eliminated Then the focus error signal is supplied to an MPX (multiplexer) 11 through a VCA (voltage controlled oscillator) 9. Similarly, the tracking error signal is supplied to the MPX 11 through an LPF 26 comprising a resistor $R_3$ and a capacitor $C_3$ and an LPF 27 comprising a resistor $R_4$, a capacitor $C_4$ and an electronic switch circuit $SW_2$ in which unnecessary frequency components are eliminated, and a VCA 10.

The LPFs 24 and 26 are provided for the purpose of eliminating noise components outside the frequency band before an A/D (analog to digital) conversion process which will be described later The cut-off frequencies $f_{c1} (=\frac{1}{2}\pi C_1 R_1)$ and $f_{c3} (=\frac{1}{2}\pi C_3 R_3)$ of the LPFs 24 and 26 respectively are set at a frequency of around 12 KHz, assuming that the sampling frequency of the A/D conversion is 33 KHz and the bandwidth of the focus and tracking servo systems is 1 KHz. On the other hand, the cut-off frequencies $f_{c2} (=\frac{1}{2}\pi C_2 R_2)$ and $f_{c4} (=\frac{1}{2}\pi C_4 R_4)$ of the LPFs 25 and 27 are set at a frequency around 5 KHz. The LPFs 25 and 27 are selectively used by the control of a servo controller 15 which will be described later, to perform a function to eliminate high frequency components which have not been removed by LPFs 24 and 26. The frequency relationship among the cut-off frequencies and the sampling frequency $f_s$ is as follows:

$f_s > f_{c1} > f_{c2}$ for the focus servo system $f_s > f_{c3} > f_{c4}$ for the tracking servo system The MPX 11 is configured to transmit the focus error signal and the tracking error signal to an A/D converter 12 of the next stage in a time division multiplexing fashion. The error signals digitized in the A/D converter 12 are supplied to a PWM (pulse width modulation) circuit 14 after passing through a digital equalizer (EQ) 13 in which the frequency characteristic of the error signal is compensated. In the PWM circuit 14, drive signals respectively having a pulse width corresponding to the magnitude (level) of the error signal are generated and supplied to the focus actuator and the tracking actuator which have been mentioned before. The PWM circuit 14 also produces a drive signal having a pulse width corresponding to the level of a low-frequency component extracted from the tracking error signal and compensated in the frequency characteristic in the digital EQ 13. This drive signal is supplied to a carriage motor (not shown), that is, the power source for driving the carriage on which the pickup is mounted.

The above-described circuit elements as a whole form a digital servo system for executing the analog-to-digital conversion and for digitally processing each error signal. The operation of this digital servo system is controlled by a servo controller 15 consisting of a microcomputer. The servo controller 15 performs such operations as the on-off control of each servo loop, the generation of the drive signal for moving up/down the objective lens, the gain control of the VCAs 9 and 10, and the control of the equalizing characteristic of the digital EQ 13.

The read-out RF signal, that is, the output signal of the adder circuit 5 is supplied to an RF reproducing circuit 16 and an RF envelop detector 17. If the disc to be played is a compact disc, the read-out RF signal is an EFM (eight-to-fourteen modulation) signal, and the EFM signal is demodulated by an EFM demodulation operation in the RF reproducing circuit 16. Furthermore, an error correction operation is performed to the demodulated signal. Subsequently, the signal is converted to the left and right audio signals through a D/A (digital-to-analog) conversion process. The RF reproducing circuit 16 also produces a phase error signal corresponding to the phase error of a playback clock signal extracted from the readout RF signal with respect to a reference clock signal. Furthermore subcode information is decoded from the EFM demodulation data in the RF reproducing circuit 16. The phase error signal is supplied to the PWM circuit 18 through the servo controller 15, and a drive signal having a pulse width corresponding to the level of the error signal is supplied from the PWM circuit 18 to a spindle motor (not shown) for rotating the disc. The subcode information is supplied to the system controller 19. An RF envelope detected in the RF envelope detector 17 is digitized in an A/D converter 20, and supplied to the servo controller 15 through a digital LPF 28.

In the servo controller 15, a defect detection operation for detecting flaw or dirt on the information bearing layer of the disc is performed by detecting a first noise component having very low frequencies, from the low frequency component of the RF envelope signal supplied through the LPF 28, and further by detecting a second noise component having very high frequencies from a high frequency component of the tracking error signal supplied through a HPF (high-pass filter) 29. Upon detection of the defect of the disc, the servo controller 15 turns on either or both of the switch circuits SW₁ and SW₂ in the LPFs 25 and 27 during a period including a period of detection and a predetermined period after the lapse of the detection period. By this operation, both or either of the LPFs 25 and 27 are activated.

Figure 4A:
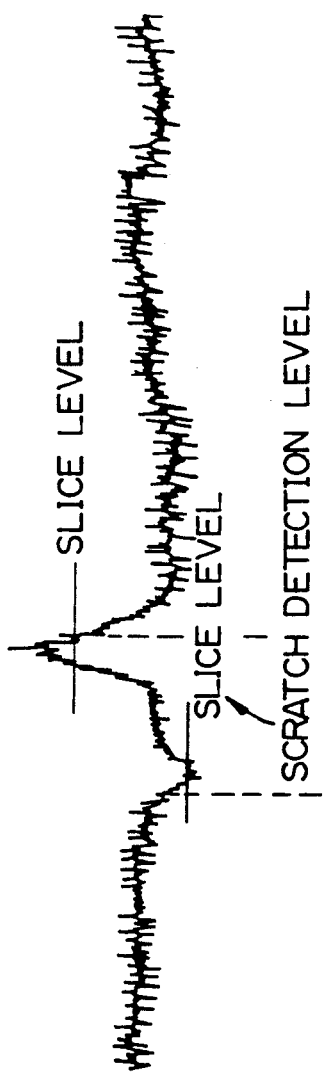
Figure 4B:
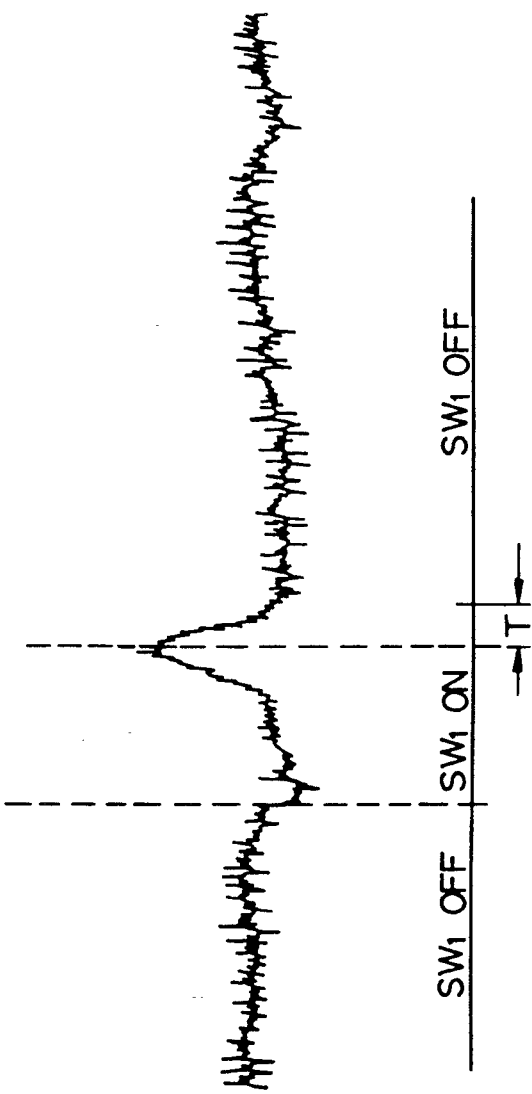
Figure 5A:
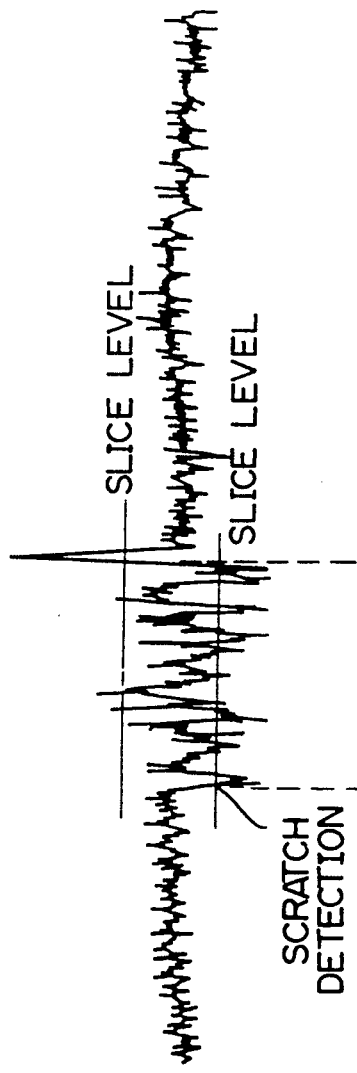
Figure 5B:
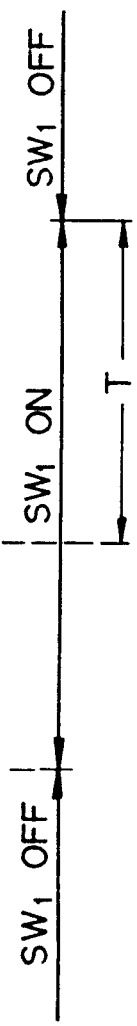

Through the operation described above, the high frequency components which have not been suppressed by the LPFs 24 and 26 can be eliminated. FIGS. 4A and 4B, 5A and 5B are waveform diagrams respectively showing the first and second noise components in the tracking servo system, in which FIGS. 4A and 5A show the waveforms of the signal before the LPF 27, and FIGS. 4B and 5B show the waveforms of the signal having passed through the LPF 27. Furthermore, the system is configured that the aforementioned predetermined time period T can be varied for each of the first and second noise components, and the time period T is determined according to the track length on the disc to be covered.

The system controller 19 consists of a microcomputer, and executes the operations of controlling the whole system including the servo controller 15 in response to operating commands supplied from the key board 21, or the subcode information supplied from the RF reproduction circuit 16. The system controller 19 further performs operations for controlling the display through a display device 22, and for driving a loading mechanism 23 for loading or unloading the disc.

The operational steps of the loop gain setting method of the present invention, which is executed by the processor of the system controller 19, will be explained with reference to the flowchart of FIG. 6. It is assumed that this loop gain setting process is started at the time when the loading and the clamp of the disc are completed, and the arrival of the carriage carrying the pickup to the innermost position is detected.

When the arrival of the carriage to the innermost position is detected by a detection means (not shown), the processor executes an initializing operation for resetting data stored in an internal memory such as the RAM, and count values of various counters (step S1). Then, the processor turns on the laser source of the pickup (step S2). Subsequently, the processor executes operations of a focus-gain constant selecting mode for selecting a gain constant $G_F$ for setting the loop gain of the focus servo loop on the basis of a p-p (peak to peak) value, for example, representing the magnitude of the amplitude of the focus error signal (step S3). The processor stores the gain constant selected in this mode in the internal memory as a selected focus-gain constant (step S4). The operations of the focus-gain constant selecting mode will be described later. After selecting the focus-gain constant $G_F$, the processor executes operations of a tracking-gain constant selecting mode for selecting a gain constant GT for setting the loop gain of the tracking servo loop on the basis of a p-p value for example, representing the magnitude of the amplitude of the tracking error signal (step S5). The processor stores the gain constant selected in this mode in the internal memory as a selected tracking-gain constant (step S6). The operations of the tracking-gain constant selecting mode will be described later. Then the processor sets the gain of VCAs 9 and 10 so that the loop gains corresponding to the gain constants $G_F$ and $G_T$ are attained (step S7), to complete the series of operations for setting the loop gain.

Figure 7:
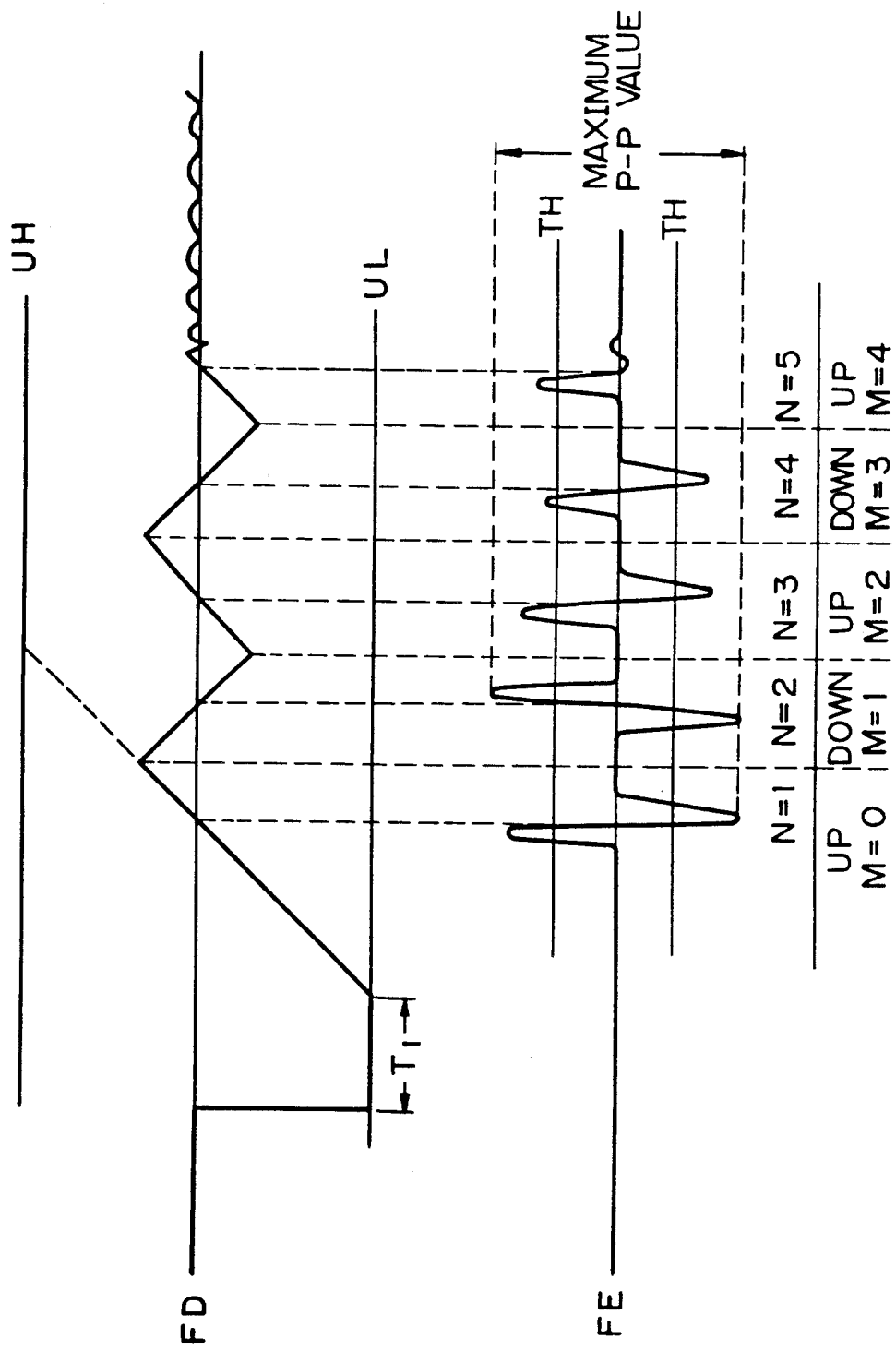
FIG. 7 is a timing chart showing the processing operation in a focus-gain constant selecting mode.
Figure 8B:
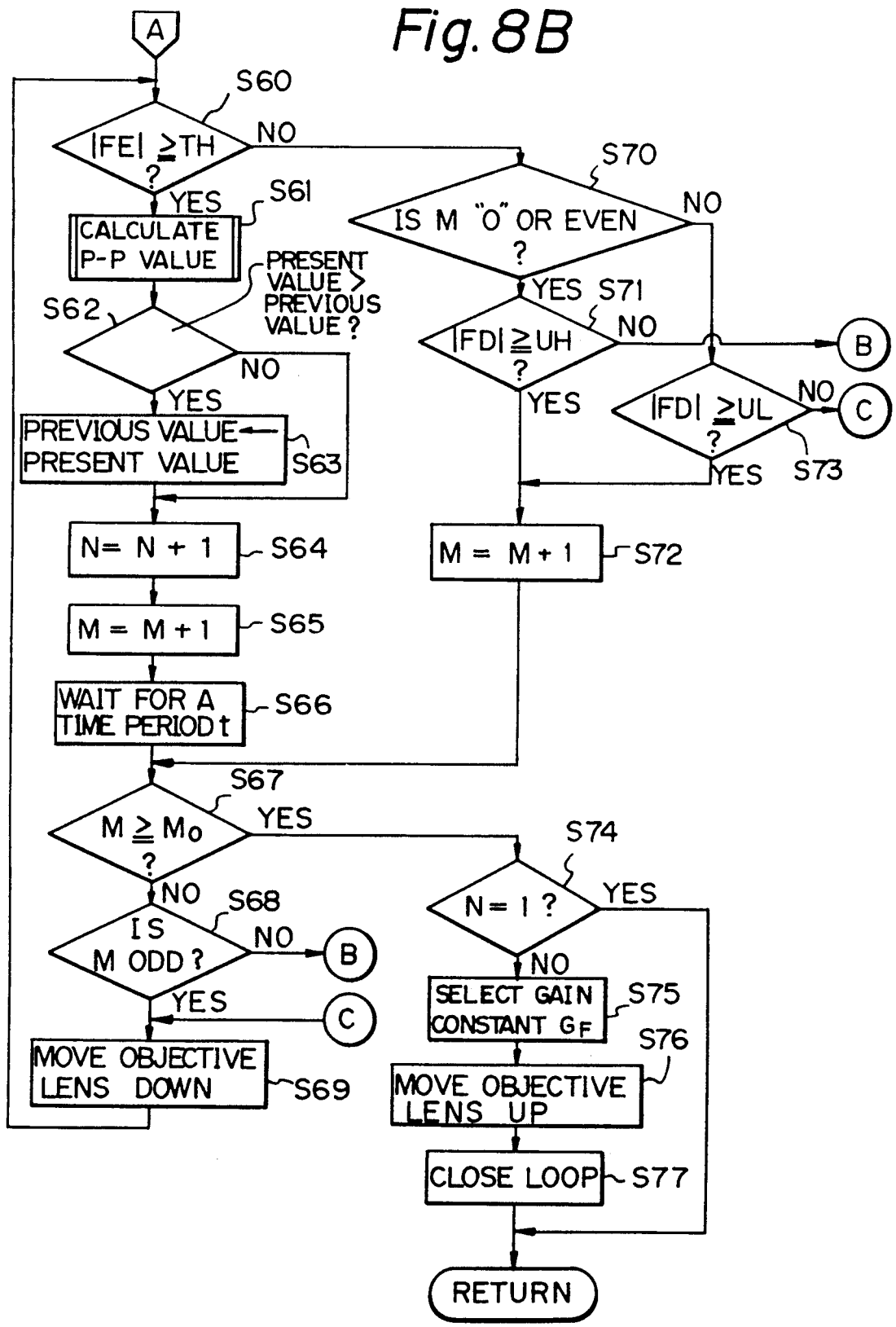

Referring to the flowchart of FIG. 8, an example of the procedure in the focus gain selecting mode will be explained hereinafter, with reference also to the timing chart of FIG. 7. It is assumed that this procedure is performed while the servo loops are opened.

Firstly, in order to drive the spindle motor in the normal direction, the processor executes the control of the servo controller 15, to activate the PWM circuit 18 so that it generates a normal-direction driving pulse signal having a wave-height value H, as a kick pulse (step S51). After the elapse of a predetermined time period W (100 millisecond, for example), which is detected in step S52, the processor makes the servo controller 15 to stop the generation of the normal-direction driving pulse (step S53). The speed of rotation of the spindle motor is determined by the pulse width and the pulse height of the normal-direction driving pulse signal. The pulse width W and the pulse height H are determined so that the spindle motor rotates during a short period and at a slow speed which is much lower than the constant speed for the play operation.

Then, in order to move the objective lens downwards, the processor executes the control of the servo controller 15 so that it generates a negative driving voltage (FD) (step S54). The objective lens is driven downwards until the absolute value of the driving voltage |FD| becomes higher than a lower limit value (UL) of the focus driving voltage (step S55). When |FD|

$\geq UL$ is satisfied, the timer-counter is activated to start counting (step S56). The counting operation of the timer-counter is performed in synchronism with the internal reference clock. By using the count value of the timer-counter, whether a predetermined time period T (50 milliseconds for example) is elapsed from the time when $|FD| < UL$ was attained is detected (step S57), and the count value N of the internal counter I is incremented upon detection of the elapse of the predetermined time period T (step S58). At the same time, in order to raise the objective lens, the servo controller 15 is controlled to generate a ramp-form signal (FD) whose level increases gradually (step S59). The count value N represents the number of times where the p-p value of the S-curve is retrieved.

Then the processor retrieves the error data obtained as the output signal of the A/D converter 12, and judges whether or not the absolute value of the error data $|FE|$ has risen to be higher than a threshold level $T_H$ (step S60). If $|FE| \geq TH$, it is judged that the focus-error rather than the noise is present, and the processor calculates the p-p value, that is, the difference between the positive and negative wave heights by using the retrieved error data (step S61). This is because the focus error signal has an S-curve characteristic near the in-focus position of the objective lens. The calculation of the p-p value of the S-curve is performed, for example, as follows. At first, the present value and the previous value of the error data are compared, which error data is retrieved at every sampling timing of the A/D conversion. For positive wave-height values, a previous value when the present value is lower than the previous value is used as each wave-height value. Conversely, for negative wave-height values, a previous value when the present value is higher then the previous value is used as each wave-height value. The p-p value is derived as the difference between the positive and negative wave-height values obtained as described above.

Then the present value of the p-p value obtained as described above is compared with the previous value of the p-p value (step S62), and the present value is stored in memory as a new "previous value" when the present value is greater than the previous value (step S63). If the present value is equal to or smaller than the previous value, the previous value is maintained as it is. Through the above-described procedure, the maximum value among the p-p values which have been retrieved is stored in memory. Subsequently, the count value N of the internal counter I and the count value M of the internal counter II are incremented respectively (steps S64 and S65). The count value M represents the number of times where the objective lens is moved up/down. Then, after the elapse of a predetermined time period t (5millisecond, for example) which is detected in step S66, the processor judges whether or not the count value M of the internal counter II is higher than a predetermined value $M_O$ (4 for example), that is, whether or not the up/down movement of the objective lens has occurred more than $M_0$ times (step S67).

If $M < M_O$, the processor then judges whether or not M is an odd number (step S68). If M is equal to zero or an even number, the processor returns to step S69, to turn-over the lens driving direction, and repeats the operations described above. If M is an odd number, the processor turns over the lens driving direction, and in order to move the objective lens downwards, executes the control of the servo controller 15, to generate a driving voltage (FD) of a ramp form whose level decreases gradually (step S69). Then the processor returns to step S60, to repeat the process described above.

If it is judged in step S60 that $|FE| < TH$, then the processor judges whether or not the count value M of the internal counter II is equal to zero or an even number (step S70). If it is judged that M is equal to zero or an even number, the processor then judges whether or not the driving voltage FD has exceeded an upper limit value UH thereof (step S71). If $FD \geq UH$, the processor increments the count value M of the internal counter II (step S72), and proceeds to step S67 subsequently. If $FD > UH$, the processor returns to step S59, to repeat the above-described procedure. If it is judged in step S70 that M is an odd number, the processor then judges whether or not the driving voltage FD has reduced lower than its lower limit value UL (step S73). If $|FD| \leq UL$, the processor proceeds to step S72, and it proceeds to step S69 if $|FD| > UL$.

If it is judged in step S67 that $M \geq M_O$, the processor judges whether or not the count value N of the internal counter I is equal to "1" (step S74). If $N = 1$, it means that the p-p value of the S-curve to be used as a reference for setting the loop gain has not been retrieved even once through the $M_O$ times of up/down movement of the objective lens, and the above-described sequential process will be terminated without setting the loop gain. In this case, the process is repeated once more. If $N \neq 1$, the loop gain constant $G_F$ of the focus servo loop is selected (step S75) by using the maximum value of the p-p value finally stored in memory in step S63. Subsequently, in order to move the objective lens upwards, the processor executes the control of the servo controller 15, so that it generates the driving voltage (FD) of the ramp-form whose level increases gradually (step S76). Then, the processor puts the servo loop in the closed state (step S77). By this operation, the sequential procedure for setting the loop gain $G_F$ is completed.

It will be understood that the explanation of the above procedure in the focus gain constant selecting mode has been made for the illustrative purpose only, and various changes may be made without departing from the gist of the present invention.

Figures 9, 10:
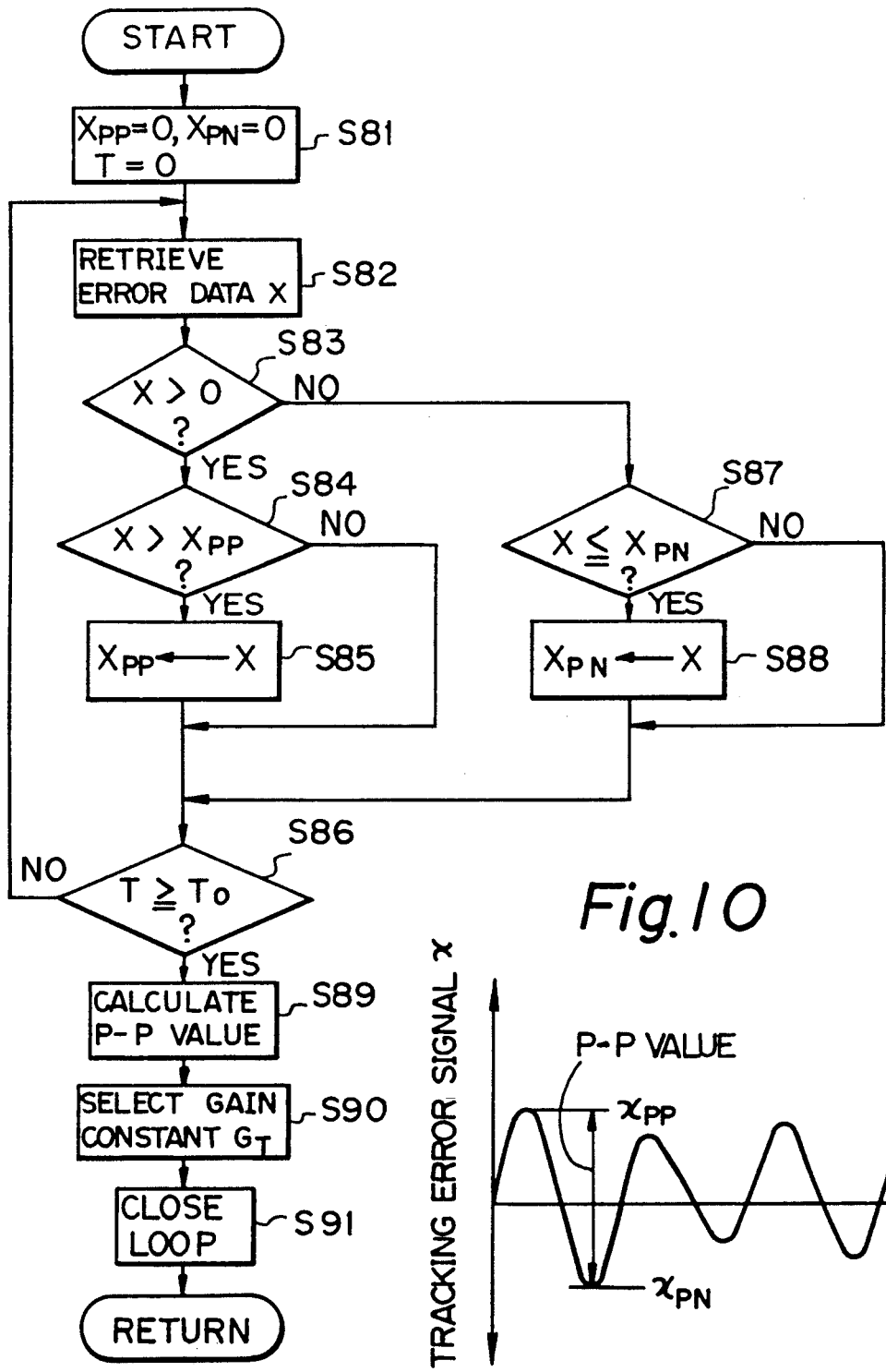
FIG. 9 is a flowchart showing the procedure in a tracking-gain constant selecting mode.
FIG. 10 is a waveform diagram showing the waveform of a tracking error signal obtained while the tracking servo loop is opened.
Figure 11A:
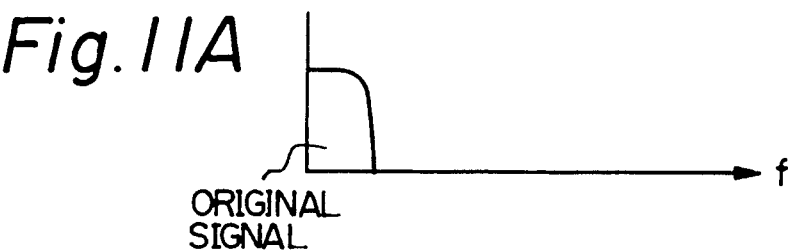
FIGS. 11A and 11B are diagrams showing the change in the frequency spectrum caused by sampling, when the frequency of the original signal is lower than fs/2.
Figure 11B:
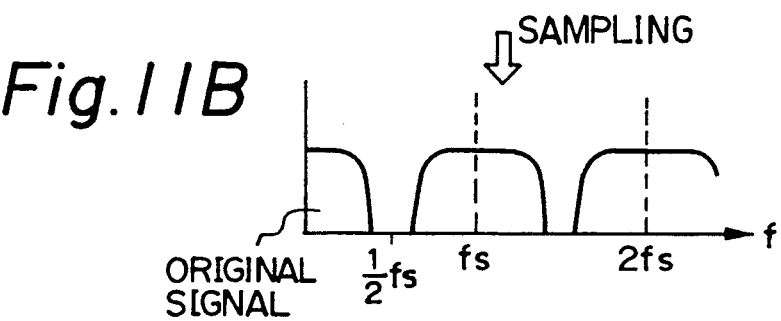
Figure 12A:
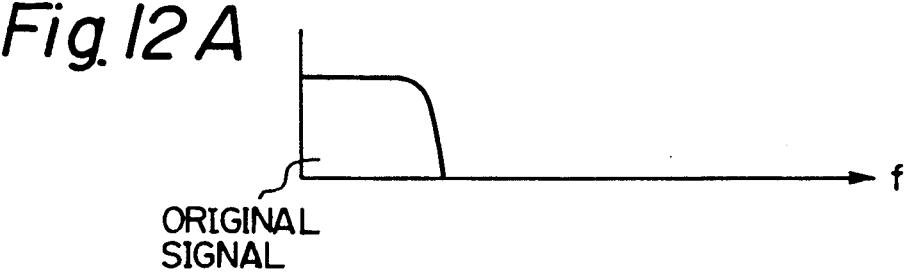
FIGS. 12A and 12B are diagrams showing the change in the frequency spectrum caused by sampling, when the frequency of the original signal is higher than fs/2.
Figure 12B:
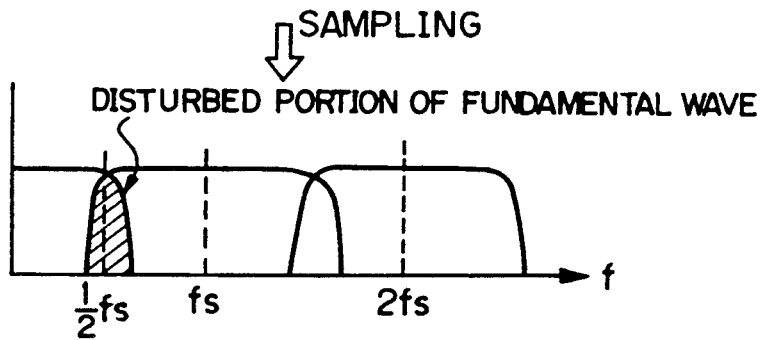

An example of procedure in the tracking-gain constant selecting mode described before will be explained with reference to the flowchart of FIG. 9. It is assumed that the procedure to be described is executed upon starting of the operation of the spindle servo system, after the speed of rotation of the disc has reached a predetermined speed (in the case of CDs, 200~300 r.p.m., for example) while the servo loop is open. When the servo loop is open, the tracking error signal varies as shown in FIG. 10.

Firstly, the processor executes an initial setting process, by which detection peak values $X_{pp}$ and $X_{PN}$ to be stored in the internal register, and the count value T of the counter which counts up in synchronism with the sampling timing of the A/D converter are reset (step S81). Subsequently, the processor retrieves tracking error data x (step S82). The retrieval of the tracking error data x is executed in synchronism with the sampling timing described above.

Subsequently, the processor judges whether or not the error data x is positive (step S83). If $x > 0$, the processor judges whether or not the error data x is greater than the detected peak value xPP up to the previous time (step S84). If $x > xPP$, the error data x retrieved this time is stored as the new value of the detected peak value xPP (step S85). Subsequently, the processor proceeds to step S86. If $x \leq x_{pp}$, the processor directly proceeds to step S86. In step S86, a time period $T_O$ for retrieving the error data x is controlled by using the count value T of the timer-counter. The time period $T_O$ is selected, for example, to start from the time when the speed of rotation of the disc has reached the predetermined speed upon starting of the operation of the spindle servo, and to end upon the lapse of a time period required for at least one revolution of the disc subsequently. If the time period $T_O$ for the retrieval has not elapsed, the processor returns to step S82, to repeat the process described above.

If it is judged in step S83 that $x \leq 0$, the processor then judges whether or not the error data x is equal to or smaller than the detected peak value xPN up to the previous time (step S87). If $x \leq x_{PN}$, the processor stores the error data x retrieved this time, as the detected peak value $x_{PN}$ (step S88). Subsequently, the processor proceeds to step S86. If $x > x_{PN}$, the processor directly proceeds to step S86. If it is judged in step S86 that the time period $T_O$ for retrieving the error data has elapsed, the detected peak values $x_{PP1 \text{ and } xPN}$ at that time are to be used positive and negative maximum peak values $P_P$ and $P_N$. Therefore, the processor calculates the p-p value by using the peak values $P_P$ and $P_N$ (step S89). Then the processor selects the gain constant $G_T$ corresponding to the calculated p-p value (step S90), and puts the servo loop in the open state (step S91). By this operation, the sequential procedure for setting the loop gain $G_T$ is completed.

It will be understood that the explanation of the above procedure in the tracking gain constant selecting mode has been made for the illustrative purpose only, and various changes may be made without departing from the gist of the present invention. For example, the tracking error data can be gathered by rotating the disc at a low speed of about 100 r.p.m., and moving the information reading spot radially with respect to the disc, so that the tracking error data obtained under such a condition are retrieved as sampling values.

As specifically explained in the foregoing, the servo system of a disc player according to the present invention is structured such that the bandwidth of the error signal supplied to the A/D converter is normally limited by means of the filter circuit having the first transmission characteristic with the cut-off frequency below one half of the sampling frequency of the A/D converter. When certain noise components are contained in the error signal and the presence of such noise components is detected, the noise components are shut-off for the predetermined period after the detection by another filter circuit having the second transmission characteristic with the cut-off frequency below that of the first transmission characteristic. Therefore, whatever kind of scratch or flaw may exist on the surface of the information bearing layer of the disc, the noise components originated by such scratch or flaw can be completely suppressed. Influences of the aliasing noise in the pass-band will thus be avoided, to prevent the generation of problems such as the signal drop-out or the track-jumping.

What is claimed is:

1. A servo system for a disc player having a pickup for reading information recorded on an information recording disc, said servo system including an A/D converter for converting an error signal produced on the basis of signals output from said pickup into a digital signal, and adapted to drive and control said pickup according to the signal level of said error signal having been processed digitally, said servo system further comprising:

filter means for permitting low frequency components of said error signal to pass therethrough and supplying said low frequency components to said A/D converter;

detection means for detecting noise components having levels higher than a predetermined level, contained in said error signal; and means for generating a control signal for a predetermined period after an instant of detection of said noise components by said detection means, wherein said filter means is adapted to have a first transmission characteristic with a cut-off frequency below one half of a sampling frequency of said A/D converter when said control signal is absent, and a second transmission characteristic with another cut-off frequency lower than said cut-off frequency when said control signal is present.

2. The servo system claimed in claim 1, wherein said filter means comprising:

a first filter having said first signal transmission characteristic, inserted in a signal path of said error signal; and a second filter having said second signal transmission characteristic, inserted in said signal path of said error signal only when said control signal is present.

* * * * *